May 1, 1956 W. H. ARMACOST 2,743,709
EQUALIZING THE TEMPERATURE OF HIGH PRESSURE BOILER DRUM WALLS
Filed April 12, 1952 3 Sheets-Sheet 1

INVENTOR.
Wilbur H. Armacost
BY
ATTORNEY

May 1, 1956 W. H. ARMACOST 2,743,709
EQUALIZING THE TEMPERATURE OF HIGH PRESSURE BOILER DRUM WALLS
Filed April 12, 1952 3 Sheets-Sheet 2

INVENTOR.

BY Wilbur H. Armacost

ATTORNEY

May 1, 1956 W. H. ARMACOST 2,743,709
EQUALIZING THE TEMPERATURE OF HIGH PRESSURE BOILER DRUM WALLS
Filed April 12, 1952 3 Sheets-Sheet 3
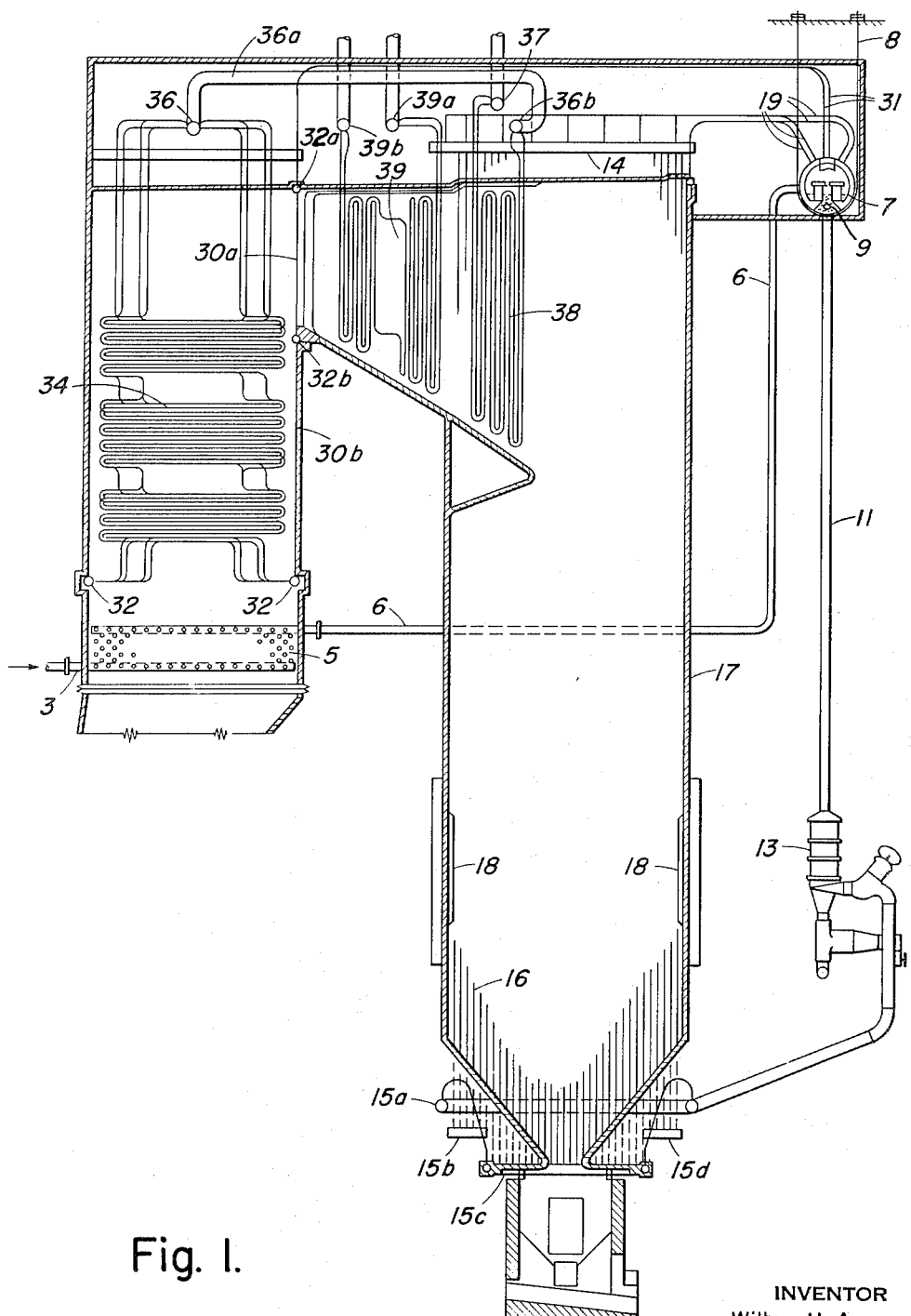
Fig. I.
INVENTOR
Wilbur H. Armacost
BY
ATTORNEY

United States Patent Office 2,743,709
Patented May 1, 1956

2,743,709

EQUALIZING THE TEMPERATURE OF HIGH PRESSURE BOILER DRUM WALLS

Wilbur H. Armacost, Scarsdale, N. Y., assignor to Combustion Engineering, Inc., New York, N. Y., a corporation of Delaware Application April 12, 1952, Serial No. 281,968

8 Claims. (Cl. 122—411)

This invention relates to improvements in boiler drum design and is more particularly concerned with eliminating or greatly reducing thermal stresses in the wall of the steam and water drum of high pressure steam generating units when these units are put in or taken out of operation.

In starting up a high pressure boiler primary consideration must be given to maintaining a uniform temperature throughout the drum so as to avoid excessive thermal stresses in the drum wall. In the past this has been accomplished by slowly raising the pressure of the unit and thereby the temperature of the drum uniformly. This procedure obviously increases considerably the time required to start up a steam generating unit operating under high pressure. If this starting up and shutting down procedure must be repeated frequently such as every day or every other day, it becomes extremely important from the standpoint of power plant operating efficiency to perform this operation as rapidly as possible.

The instant application, which is a continuation-in-part of my application Serial Number 157,587 filed April 22, 1950, now abandoned, discloses means for accomplishing the above result; said means being of wide application to a variety of boilers including forced circulation and natural circulation boilers.

The primary object of my invention is to considerably reduce the time which is required to start up or shut down a high pressure steam generating unit.

A more specific object is to eliminate or greatly reduce thermal stresses in the thick walls of high pressure drums during shut down or start up operation.

Another object is to increase the active life as well as lower the maintenance costs of high pressure steam generating units being subject to the deteriorating influences of frequent shutdowns.

A further object is to increase operating safety by reducing to a minimum the possible damage to which high pressure drums may be subjected when the shutting-down or starting-up operation of the steam generator is inexpertly handled or subject to incompetence or accidental error in judgment by the operating personnel.

Other objects and advantages will become apparent as the description of illustrative embodiments of the invention proceeds. In the accompanying drawings which show such embodiments:

Figure 1 is a vertical sectional view (somewhat diagrammatic) of the forced circulation boiler of a commercial steam generating unit employing my inventive organization.

The illustrative steam generator to be benefited

The inventive apparatus herein disclosed may be exemplified in conjunction with a high pressure radiant type boiler operating with forced circulation and having a single water and steam drum, and will be described with initial reference thereto.

One commercial embodiment of such a boiler being manufactured by the assignee of the instant application is shown in Figure 1 of the drawings. This boiler has a guaranteed output of 875,000 pounds of steam per hour at a temperature of 1050° F. and a pressure of 1850 pounds per square inch and is equipped with a steam and water drum 7 that is approximately 4½ feet in diameter and 40 feet long. Within said drum 7 is disposed drum-internal apparatus which incorporates the new features of this invention and which will be more fully described presently.

Figure 2:
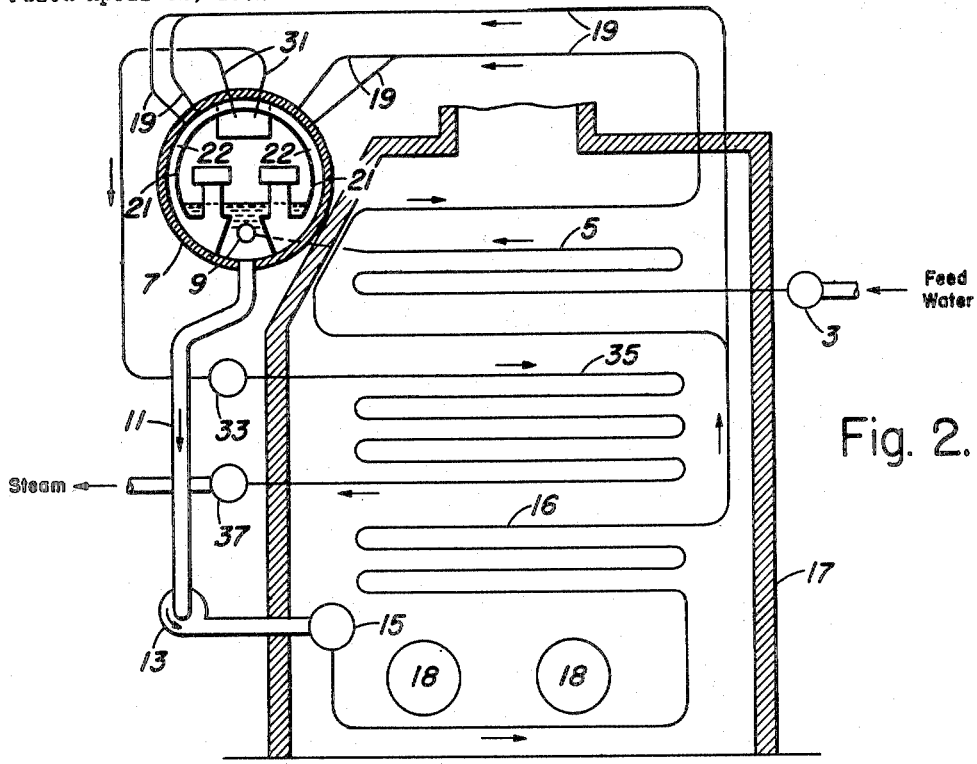
Figure 2 is a simplified schematic representation of such a boiler showing the steam and water drum thereof equipped with the inventive apparatus herein disclosed.
Figure 4:
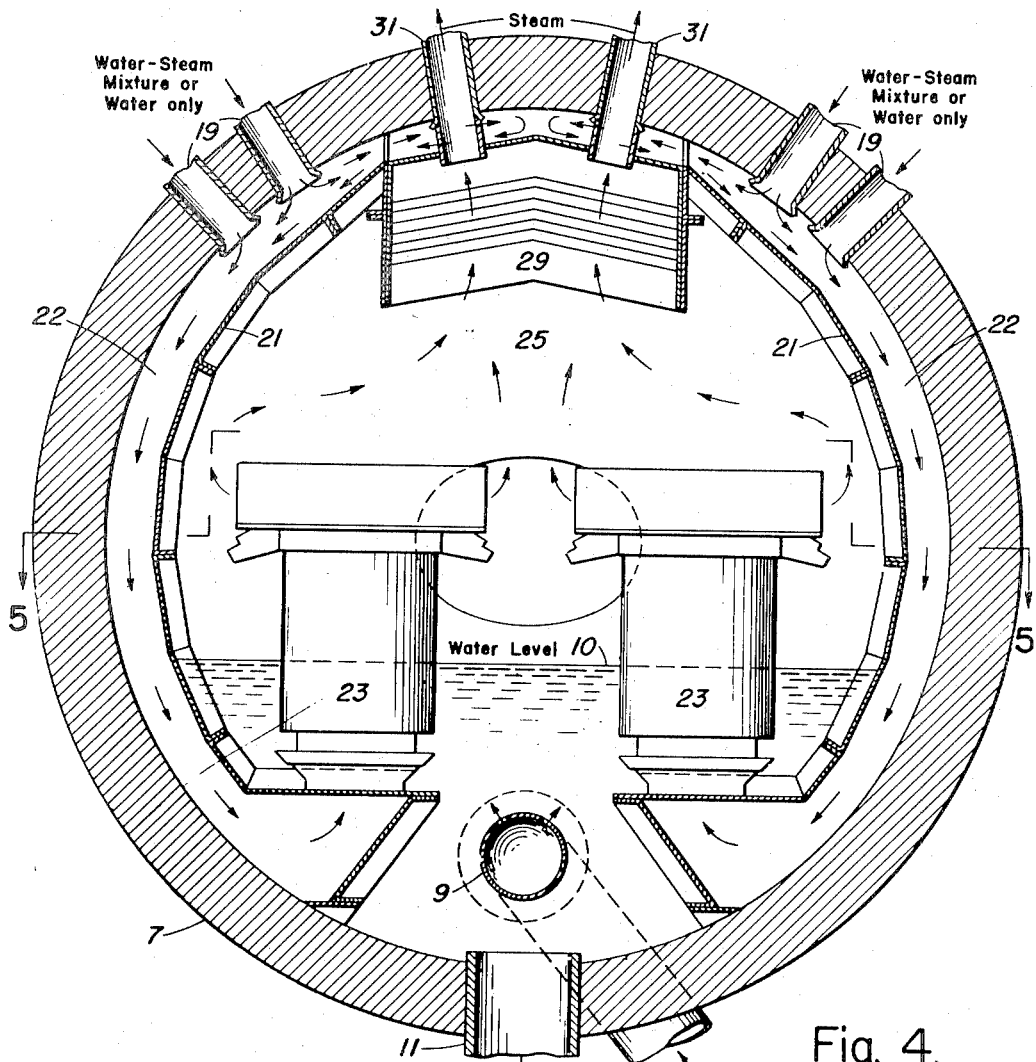
Figure 4 is a transverse section through the steam and water drum enlarged to show how water and steam flow controlling devices may satisfactorily be installed therein to accomplish the desired objects of the invention.
Figure 5:
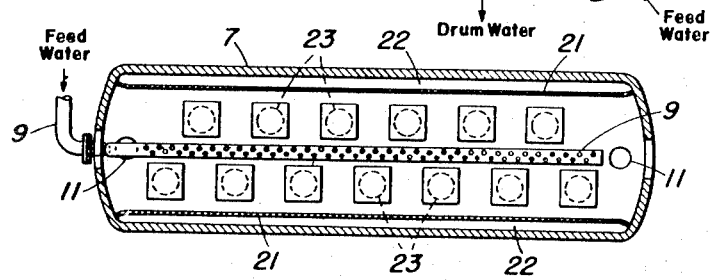
Figure 5 is a reduced scale schematic horizontal longitudinal section through the steam and water drum (taken on line 5—5 of Figure 4) and showing how the herein disclosed temperature equalizing means extends substantially over the entire surface of the drum.

Referring specifically to said Figure 1 and to the simplified showing of the complex organization of said Figure 1 as depicted in Figure 2, make up water is fed under pressure to the economizer inlet header 3 and after being heated in economizer 5 flows via conduit 6 (Figure 1) to steam and water drum 7 which is remote from and out of heat exchange relation with furnace 17 and derives its support through suitable hangers 8 (Figure 1). The water flowing to said drum from economizer 5 is distributed along the length thereof by feed pipe 9 (see Figures 4 and 5) partly filling the drum to water level indicated at 10.

From the drum 7 the water enters conduit 11 leading to forced circulation pump 13 which forces the water through the various vaporizing circuits by way of suitable distributing headers. In the more complex organization of Figure 1 these headers take the form of a primary toroidal header 15a feeding into a plurality of vaporizing circuit headers 15b, 15c and 15d, while in the simplified view of Figure 2 the headers are represented by the single conduit 15. The vaporizing circuits, designated generally by numeral 16, constitute heating surfaces arranged on the side walls, front and rear walls, floor and roof of the furnace 17, as well as other heating surfaces arranged to cool the walls of gas passages of the unit. Heat is generated in said furnace 17 by firing fuel burners 18, with part of said heat being absorbed by the aforesaid vaporizing circuit's heating surfaces.

In accordance with my invention the steam and water mixture from these vaporizing circuits 16 is discharged into suitable headers at the uppermost portion of the boiler, one of which is shown at 14 in Figure 1, and from there passes to the upper portion of steam and water drum 7 by tubes 19 (see Figures 1, 2, 3 and 4) and into the space between baffle wall 21 (see Figures 4 and 5) and the inner drum surface. Baffle plate 21 which extends over the entire length of the drum 7 (see Figure 5) is circumferentially arranged and may satisfactorily be spaced from the drum surface by a distance of approximately 1½". The water or water and steam mixture being confined in this space 22 in passing therethrough closely contacts and scrubs the inner surface of the drum on its way to the inlet of steam separating units 23 in which water is separated from the steam in any suitable manner as by centrifugal action. The resistance to flow through the separators is such that circulation pump 13 maintains space 22 filled with water or water and steam mixture.

While separation takes place in said units 23 the steam rises therewithin and discharges (as indicated by the arrows) into the steam space inside of the circumferential baffle wall 21 in the upper portion 25 of drum 7. The water separated from the steam and water mixture within the separators 23 flows downwardly to join the feed water entering the drum through feed pipe 9 and filling the lower part of the drum up to water level 10. The saturated steam occupying the space in the upper part 25 of the drum 7 thence passes through drying screens 29 (see Figure 4) where practically all remaining moisture is removed and dry saturated steam thereupon leaves the drum through superheater connecting tubes 31 to enter suitable superheater means.

In the organization of Figure 1 steam flowing through said tubes 31 enters superheater headers 32 via headers 32a and 32b and conduits 30a and 30b, passes through the low temperature stage 34 of a two-stage superheater into header 36 and thence is conveyed to the high temperature stage 38 of said superheater via conduit 36a and header 36b from which it passes to superheater outlet header 37; while in the simplified showing of Figure 2 merely a single stage superheater 35 is disclosed which receives steam from tubes 31 via inlet header 33 and conveys it to said outlet header 37 from which it enters the power plant's main steam line. The commercial embodiment of Figure 1 also includes a reheater 39 (not represented in Figure 2) adapted to receive steam from an intermediate stage of a turbine or the like (not shown) through inlet header 39a and reheat it to a desired temperature at a predetermined pressure. Upon leaving said reheater 39 the reheated steam enters outlet header 39b and from there passes through suitable piping to desired points of use.

The aforesaid provision of water-flow space 22 between drum shell 7 and inner baffle wall 21 makes possible an equalization of the drum metal temperature in a unique and effective manner more fully explained at a later point herein.

*The problem of quick starting of a high pressure boiler*

The problem creating a need for my inventive improvements arises as follows: The daily winter load cycle of a public utility system supplying power to a typical metropolitan area shows that late evening maximum load requirements exceed the minimum early morning loads by more than 200 percent. This great difference between maximum and minimum daily loads makes it necessary to shut down nightly some of the high pressure steam generating units, of which that shown by Fig. 1 may be considered as typical. However, in addition to the extreme variation in power requirements indicated by the aforesaid load cycle said cycle also shows an extremely high rate of load pickup in the morning hours from 5 to 9 o'clock, so that between these hours the load generally rises from 100 per cent to approximately 250 per cent.

Thus in the operation of modern power generating systems while it is necessary to frequently (even daily) shut down high pressure steam generating units (typified by Fig. 1 hereof) it is extremely desirable to start up these units within the shortest possible time commensurate with safety to the unit.

High pressure steam generators on the average having a steam pressure of from 1000 to 2000 pounds per square inch, under normal conditions require from 5 to 7 hours to be put on the line; that is, to bring the unit up to its maximum steam pressure and steam temperature. Such a long time period is required primarily in order to afford an even and slow rise in drum metal temperature.

In some conventional installations (not incorporating my inventive improvements), tests have been conducted to ascertain the drum metal temperatures by peening thermocouples in the top and bottom of the drum shell (corresponding to 7 in the drawings hereof) and temperature readings have thus been obtained during starting up and shutting down operations. These readings (in said conventional installations) indicate a temperature difference as high as 170° between the metal of the drum at the top and that at the bottom.

If it is considered that the wall thickness of a high pressure drum (such as shown at 7 herein) may well be in the neighborhood of 5 inches it can be readily appreciated by one skilled in the art of designing and operating boilers, that if steam generators of this high pressure type are rapidly started up or shut down frequently, such as every day or every other day, there is a possibility if not a likelihood that cracks may develop in the drum plate because of the large differential thermal stresses set up therein.

The above test observations serve to show the importance of heating the drums slowly when starting up a high pressure boiler, which experience has taught should not generally exceed a temperature rise per hour of more than 100 degrees. Thus for example, a boiler operating under a pressure of 1800 pounds per square inch, at which pressure the saturated steam temperature is in the neighborhood of 622 degrees, will require a period of approximately 5 hours to be raised to full pressure and temperature from a cold start.

It can be well appreciated by one familiar with power plant economics that considerable savings in operating costs such as fuel and labor can be realized if this starting up period (and shutting down period) can be shortened by even a small amount.

A recent study made by a public utility organization showed that annual savings in operating costs in that organization's system alone would amount to hundreds of thousands of dollars if the time required to put a unit on the line could be reduced a substantial amount.

It stands to reason that a shortening of the starting up period cannot be obtained by risking serious damage to the drum shell. Therefore ways and means had to be found to protect the drum from excessive temperature changes and the resulting thermal stresses.

My drum-temperature-equalization expedients herein disclosed have solved this problem in a most unique and satisfactory manner as will now be shown.

*Limitations imposed by conventional boiler designs*

In starting up a steam generating unit without the benefit of my aforesaid temperature-equalizing means the interior of the pressure parts such as boiler tubes and drums are of course filled with water before any heat is applied to the furnace. At such times the temperature of the drum shell (corresponding to 7 in the drawings hereof) is very low possibly even lower than the temperature of the water fed to the boiler (as through feed pipe 9 in the drawings hereof). As heat is applied (very slowly or intermittently) by the furnace burners (corresponding to devices 18 in the drawings hereof) the temperature of the water rises and with it the temperature of the lower part of the drum shell, that part which is in contact with the water therein. The upper part of the drum shell generally not in contact with the water and which constitutes the major portion of the shell maintains practically the same low temperature it had when starting up operations began unless considerable time is allowed for heat to travel from the lower water-touched surface of the drum to the upper portions yet untouched by steam. This is due to the relatively low heat conductivity of steel.

The temperature difference between the lower portion and the upper portion of an unprotected drum shell may therefore very likely amount to as much as 125 degrees even at atmospheric pressure. Moreover, as soon as steam is generated the inner surface of the upper cold portion of an unprotected drum shell comes in contact with steam and will soon approach its temperature, creating a similar temperature difference between the outer and inner surface of the upper portion of the drum shell as between the upper and lower portions of the drum.

As already indicated, the above described and undesirable conditions prevail during the starting up operation of a high pressure unit without the beneficial use of my new drum-temperature-equalizing expedients; and in order to avoid excessive thermal stresses in the drum plate of a conventional steam generator these conditions dictate pursuance of a cautious and slow procedure in bringing the boiler unit up to operating pressure and temperature.

*How my invention solves the problem*

The aforesaid danger in damaging the drum is greatly diminished when applying my drum-temperature-equalizing expedients for they make possible the maintaining of an even and practically equal temperature throughout the drum plate. By applying my inventive improvements to a high pressure drum it is possible to start up the boiler unit in a much shorter time than heretofore permissible without risking damage of the drum shell.

The above is made feasible by continuously scrubbing the inner surface of the upper portion of the drum shell with water while the unit is brought up to pressure. As earlier indicated, this is accomplished by installing baffle plate 21 spaced from the inner surface of the drum 7 but in close proximity therewith and discharging water into the narrow space 22 between the drum's inner surface and baffle plate 21 at substantial velocity said water having been taken (as through conduit 11) from the lower part of the drum and being recirculated, in the organization of Figures 1 and 2, by forced circulation pump 13 through the steam generating circuit 16.

Thus in starting up a boiler (such as that of Figures 1 and 2) having a steam and water drum 7 which is equipped with my inventive temperature-equalizing facilities 21—22 substantially the entire inner surface of said drum 7 is constantly flooded either with water only or with a mixture of water and steam as the starting up process proceeds, and the drum-metal temperature is thereby uniformly increased substantially at the rate at which heat is absorbed by the heating surfaces 16 and at which the steam pressure of the unit is raised.

Application of my invention to high pressure steam generating units will therefore render adherence to a long and cautious starting up period less important because my new temperature-equalizing expedients provide for automatic uniform heating of substantially all the inner surface of the drum shell regardless of how quickly, within reasonable limits, the heating of the drum may proceed.

*Natural circulation boilers also can be benefited*

Figure 3:
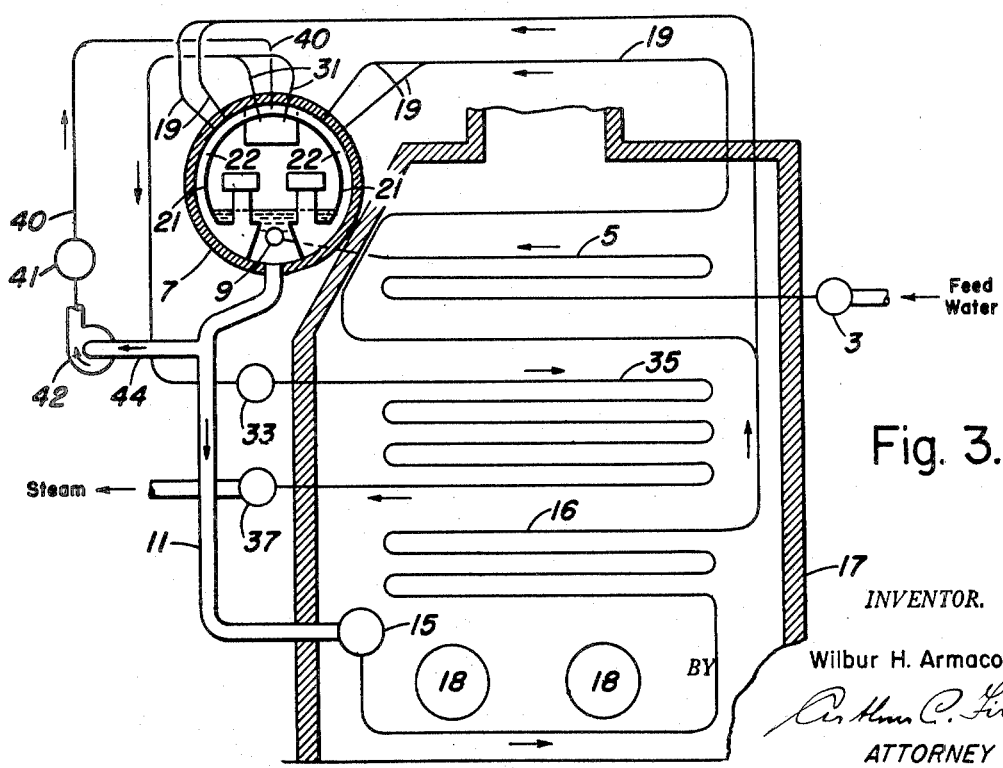
Figure 3 is a similar simplified representation showing a boiler operating with natural circulation but utilizing a supplemental water circulating circuit organized in a unique manner so as to cooperate with inventive apparatus installed within the steam and water drum.

Although the aforesaid initial description of my invention has been in connection with controlled-circulation (sometimes also designated as forced-circulation) boilers as typified by the representations of Figures 1 and 2, the invention can equally well be applied to a steam generating unit operating with natural circulation in the way typified by the schematic showing of Figure 3.

This application can be accomplished by installing a special circulation circuit such as shown in Figure 3 as comprising a circulation pump 42 which functions to draw water from the lower part of the drum 7 through conduit 44 and to discharge it through header 41 and tubes 40 into the upper portion of drum space 22, thus flooding and equalizing the temperature of the drum plate in very much the same manner as described above for the controlled circulation boiler shown in Figs. 1 and 2 and with the same beneficial results. Here also the resistance to flow through separators 23 is such, relative to the output of pump 13, as to maintain space 22 filled with water during operation of said pump.

As earlier indicated, the present application is a continuation-in-part of my earlier application Serial Number 157,587 filed April 22, 1950, for "Equalizing the Temperature of High Pressure Boiler Drums," now abandoned.

From the foregoing description and disclosure of preferred embodiments of my invention it will become apparent that these embodiments are illustrative rather than restrictive, and that the invention can be carried out in still other ways without departing from the spirit of the invention as here disclosed and claimed.

What I claim is:

1. In combination with a steam generator, a generally horizontal steam and water drum having its interior divided by a partition means into an outer substantially annular compartment generally coaxial with and extending longitudinally of the drum with the inner wall surface of said drum forming the outer wall thereof and also into an inner compartment, said inner compartment being filled to a predetermined height with water, the first mentioned outer compartment being coextensive with the upper portion of said drum and extending on each side of the drum at least below the level of the water therein, said partition being fluidly sealed to said drum with communication between said first mentioned outer compartment and said inner compartment established through a plurality of openings in said partition, a steam generating circuit having its inlet projecting into the inner compartment to a point below the predetermined water level therein and its outlet projecting into said first mentioned outer compartment, and pump means associated with said generator in a manner to pump water from said inner compartment into said first mentioned outer compartment.

2. In combination with a steam generator, a generally horizontal steam and water drum having its interior divided by a partition means into an outer substantially annular compartment generally coaxial with and extending longitudinally of the drum with the inner wall surface of said drum forming the outer wall thereof and also into an inner compartment, said inner compartment being filled to a predetermined height with water, the first mentioned outer compartment being coextensive with the upper portion of said drum and extending on each side of the drum at least below the level of the water therein, said partition being fluidly sealed to said drum with communication between said first mentioned outer compartment and said inner compartment established through a plurality of openings in said partition, a steam generating circuit having its inlet projecting into the inner compartment to a point below the predetermined water level therein and its outlet projecting into said first mentioned outer compartment, pump means associated with said generator in a manner to pump water from said inner compartment into said first mentioned outer compartment, and restrictor means associated with said openings effective to restrict flow therethrough in such a manner as to maintain said first mentioned outer compartment substantially filled with water when said pump is operating.

3. A steam generating boiler having a generally horizontal steam and water drum with a baffle disposed therein and extending substantially the entire length thereof with its ends sealably secured to the inner surface of said drum, said baffle forming a continuous wall adjacent and generally conforming to but spaced from a major portion of the inner surface of said drum and terminating in spaced longitudinal edges disposed adjacent the lowermost portion of said drum or opposite sides of a vertical plane through the axis of said drum, said longitudinal edges sealingly engaging the inner surface of said drum adjacent said lowermost portion thereby forming an outer and an inner chamber in said drum with the inner chamber having an upper steam space and a lower water space, steam and water separators extending upwardly within the steam space in the inner chamber in said drum and communicating with the outer chamber in said drum through suitable openings in the baffle adjacent said longitudinal edges, a steam generating circuit associated with said drum with its inlet communicating with the water space in the drum's inner chamber and its outlet leading to the upper portion of the drum's outer chamber, and pump means for circulating water from said water space to the upper portion of said outer chamber and thence through the steam and water separators back into said water space with the flow resistance of said separators being related to the output of said pump in such a manner as to maintain the outer chamber substantially full of water during operation of said pump.

4. In a steam generating boiler, having a generally horizontal steam and water drum, a baffle positioned within said drum and extending substantially the entire length thereof with its ends sealably secured to said drum, said baffle conforming generally to the inner surface of said drum forming a continuous wall spaced a predetermined distance from said inner surface and terminating in spaced longitudinal edges extending parallel to the drum's major axis and disposed adjacent the lowermost portion of said drum on opposite sides of a vertical plane through said major axis of the drum, said longitudinal edges sealingly engaging the inner surface of the drum adjacent said lowermost portion thereby forming an outer and an inner chamber in the drum with the inner chamber having an upper steam space and a lower water space, steam and water separators extending upwardly within the steam space in said inner chamber and communicating with said outer chamber through suitable openings in the baffle adjacent said longitudinal edges, a steam outlet means communicating with the upper portion of the steam space in the inner chamber, a steam generating circuit associated with said drum and having its inlet communicating with the water space in the inner chamber and its outlet leading to the upper portion of the outer chamber, a by-pass for said steam generating circuit effective to convey water from said water space directly to the upper portion of the outer chamber, and pump means in said by-pass effective to force water therethrough.

5. In a steam generating boiler having at least one steam generating circuit including a generally horizontal steam and water drum having a steam space in the upper portion and a water space in the lower portion thereof, the latter being filled with water to a predetermined level; the improvement comprising an unbroken baffle wall within said drum extending substantially the entire length thereof and spaced a predetermined distance from but conforming generally to the cylindrical shape of the interior surface of said drum, thereby forming a fluid tight wall generally parallel to and extending substantially over the entire interior longitudinal drum surface of said steam space portion, said baffle terminating in spaced longitudinal edges adjacent the lower portion of the drum and below the water level therein and in spaced circumferential ends, said ends together with said longitudinal edges being in sealing arrangement with the wall of the drum thereby forming a narrow longitudinal chamber between the outside of said baffle wall and the inside of said drum wall; opening means adjacent the lowermost portion of said baffle wall providing controlled flow communication between said narrow chamber and the steam and water space in said drum; said steam generating circuit having its inlet communicating with the water space in said drum and its outlet leading into said narrow chamber; and pump means cooperating with said steam generating circuit and effective to circulate water from the water space in said drum through said steam generating circuit and said narrow chamber and in contact with the entire cylindrical portion of said drum, whereby to maintain the drum wall at substantially the same temperature as that of the circulating water through intimate flow contact therewith.

6. In a steam generating boiler having at least one steam generating circuit including a generally horizontal steam and water drum having a steam space in the upper portion and a water space in the lower portion thereof, the latter being filled with water to a predetermined level, the improvement comprising an unbroken baffle wall within said drum extending substantially the entire length thereof and spaced a predetermined distance from but conforming generally to the cylindrical shape of the interior surface of said drum, thereby forming a fluid tight wall substantially parallel to and extending along the entire interior longitudinal drum surface of said steam space portion; said baffle terminating in spaced longitudinal edges adjacent the lower portion of the drum and below the water level therein and in spaced circumferential ends, said ends together with said longitudinal edges being in sealing engagement with the wall of the drum thereby forming a narrow longitudinal chamber between the outside of said baffle wall and the inside of said drum wall; communication means adjacent the lowermost portion of said baffle wall providing controlled flow communication between said narrow chamber and the steam and water space in said drum; said steam generating circuit having its inlet communicating with the water space in said drum and its outlet leading into said narrow chamber; pump means in said steam generating circuit effective to circulate water from the water space in said drum through said narrow chamber; and flow resistance means included in said communication means whereby to assure a flow of water through all portions of said narrow chamber and establish water contact with the entire cylindrical portion of said drum and thereby maintain the drum wall at substantially the same temperature as that of the circulating water through intimate flow contact therewith.

7. In a steam generating boiler having at least one steam generating circuit including a generally horizontal steam and water drum having a steam space in the upper portion and a water space in the lower portion thereof, the latter being filled with water to a predetermined level; the improvement comprising a continuous baffle wall within said drum extending substantially the entire length thereof and spaced a predetermined distance from but conforming generally to the cylindrical shape of the interior surface of said drum, thereby forming a fluid tight wall substantially parallel to and extending along the entire interior longitudinal drum surface of said steam space portion; said baffle terminating in spaced longitudinal edges adjacent the lower portion of the drum and below the water level therein and in spaced circumferential ends, said ends together with said longitudinal edges being in sealing engagement with the wall of the drum thereby forming a narrow longitudinal chamber between the outside of said baffle wall and the inside of said drum wall; communication means adjacent the lowermost portion of said baffle wall providing controlled flow communication between said narrow chamber and the steam and water space in said drum; said steam generating circuit having its inlet communicating with the water space in said drum and its outlet leading into said narrow chamber; pump means in said circuit effective to circulate water from the water space in said drum through said narrow chamber; a steam and water separator included in said communication means imparting a predetermined resistance to said water flow, whereby to assure a thorough flushing of all the portions of said narrow chamber and to establish water contact with the entire cylindrical portion of said drum and thereby maintain the drum wall at substantially the same temperature as that of the circulating water through intimate flow contact therewith.

8. In a steam generator in combination, a steam generating circuit having a water inlet and a steam and water outlet; a steam and water drum having a water space, a steam space and a water level; means forming a partition within said drum generally parallel, spacedly adjacent to and coextensive with the longitudinal drum surface of said steam space, said partition means extending below said water level and provided with ends sealingly engaged with said inner drum surface thereby dividing said steam space into an inner compartment and an outer compartment, said inner compartment being defined by the water level, the drum ends and said partition means thereabove and said outer compartment being defined by said longitudinal drum surface and said partition means; flow restricting communication means between said outer compartment and said inner compartment and said water space; communication means between the water inlet of said circuit and said water space and between the steam and water outlet of said circuit and said outer compartment; and means effective to circulate water from the water space in said drum to said outer compartment via said steam generating circuit whereby by flooding said outer compartment with water from said water space the entire inner surface of the drum can be held at substantially equal temperature.

References Cited in the file of this patent
UNITED STATES PATENTS

| | | |
|---|---|---|
| 2,170,790 | Zwilling | Aug. 22, 1939 |
| 2,402,154 | Fletcher | June 18, 1946 |
| 2,594,490 | Patterson | Apr. 29, 1952 |
| 2,648,397 | Ravese et al. | Aug. 11, 1953 |

FOREIGN PATENTS

| | | |
|---|---|---|
| 234,858 | Switzerland | Feb. 16, 1945 |